(12) United States Patent
Kimura et al.

(10) Patent No.: US 8,488,502 B2
(45) Date of Patent: Jul. 16, 2013

(54) FRAME GENERATION DEVICE, RECEPTION DEVICE, DATA TRANSMISSION/RECEPTION SYSTEM, FRAME GENERATION METHOD, AND RECEPTION METHOD

(75) Inventors: Yoshimasa Kimura, Chiba (JP); Fumio Suzuki, Chiba (JP); Koichi Moriya, Chiba (JP); Shoji Hatano, Aichi (JP); Noritoshi Hino, Aichi (JP); Masahito Taneda, Aichi (JP)

(73) Assignee: OTSL Inc. (JP)

( * ) Notice: Subject to any disclaimer, the term of this patent is extended or adjusted under 35 U.S.C. 154(b) by 0 days.

(21) Appl. No.: 12/737,503

(22) PCT Filed: Aug. 5, 2009

(86) PCT No.: PCT/JP2009/063894
§ 371 (c)(1), (2), (4) Date: Apr. 20, 2011

(87) PCT Pub. No.: WO2010/016531
PCT Pub. Date: Feb. 11, 2010

(65) Prior Publication Data
US 2011/0211512 A1   Sep. 1, 2011

(30) Foreign Application Priority Data
Aug. 5, 2008 (JP) .................. 2008-202258

(51) Int. Cl.
*H04W 56/00* (2009.01)
(52) U.S. Cl.
USPC ......................................... 370/311; 370/328

(58) Field of Classification Search
USPC .................................................. 370/311, 445
See application file for complete search history.

(56) References Cited

U.S. PATENT DOCUMENTS

| | | | | |
|---|---|---|---|---|
| 6,459,691 | B1 | 10/2002 | Abe | 370/335 |
| 2004/0240453 | A1* | 12/2004 | Ikeda et al. | 370/395.21 |
| 2005/0254444 | A1 | 11/2005 | Meier et al. | 370/312 |
| 2006/0062244 | A1* | 3/2006 | Oksman | 370/465 |
| 2006/0146887 | A1* | 7/2006 | Muguruma et al. | 370/503 |
| 2007/0201467 | A1 | 8/2007 | Kakani | 370/390 |
| 2007/0201468 | A1 | 8/2007 | Jokela | 370/390 |

FOREIGN PATENT DOCUMENTS

| | | |
|---|---|---|
| CN | 1163545 | 10/1997 |
| CN | 1452081 | 10/2003 |
| EP | 0319219 | 6/1989 |
| JP | 5114883 | 5/1993 |
| JP | 9307964 | 11/1997 |
| JP | 11177523 | 7/1999 |

(Continued)

OTHER PUBLICATIONS

European Search Report dated Apr. 22, 2013, Appln. No. PCT/JP2009003686, cover pg., pp. 1-5, Supplementary European Search Report and Annex to the European Search Report.

(Continued)

*Primary Examiner* — Dang Ton
*Assistant Examiner* — Pamit Kaur
(74) *Attorney, Agent, or Firm* — Adams & Wilks

(57) ABSTRACT

A distribution data presence/absence information generation section generates distribution data presence/absence information indicating whether or not data is included in a frame. A synchronization information generation section generates synchronization information including the distribution data presence/absence information.

10 Claims, 17 Drawing Sheets

FOREIGN PATENT DOCUMENTS

| | | |
|---|---|---|
| JP | 11252009 | 9/1999 |
| JP | 2001326600 | 11/2001 |
| JP | 2007312314 | 11/2007 |
| WO | 2006115999 | 11/2006 |

OTHER PUBLICATIONS

Chinese Office Action and its English-language machine translation dated Mar. 28, 2013, Appln. No. 200980131141.4.

* cited by examiner

FRAME GENERATION DEVICE, RECEPTION DEVICE, DATA TRANSMISSION/RECEPTION SYSTEM, FRAME GENERATION METHOD, AND RECEPTION METHOD

CROSS-REFERENCE TO RELATED APPLICATIONS

This application is a U.S. national stage application of International Application No. PCT/JP2009/063894 filed Aug. 5, 2009, claiming a priority date of Aug. 5, 2008, and published in a non-English language.

TECHNICAL FIELD

The present invention relates to a frame generation device, a reception device, a data transmission/reception system, a frame generation method, and a reception method which are used for performing radio communications.

The present application claims priority from Japanese Patent Application No. 2008-20258 filed in Japan on Aug. 5, 2008, the content of which is hereby incorporated by reference into this application.

BACKGROUND ART

Up to now, there is known a data transmission/reception system using radio communications to perform data transmission from a transmission device to a plurality of reception devices, in which data is transmitted by using a frame including synchronization information, address information for identifying and calling a reception device to which the data is to be transmitted from among the plurality of reception devices, and the data addressed to the reception device (see, for example, Patent Literature 1).

CITATION LIST

Patent Literature

[PTL 1]: JP 2001-326600 A

SUMMARY OF INVENTION

Technical Problem

However, in the data transmission/reception system disclosed in Patent Literature 1, each of the reception devices performs determination as to whether or not the data addressed to the own reception device is to be transmitted by checking contents of the address information transmitted subsequently to the synchronization information. Therefore, the reception device always needs to check the address information, which increases a reception operation time period. This raises a problem that the reception device consumes large power. In addition, because the reception device consumes large power, there is a problem that a battery operation time period becomes short in a case where the reception device operates on a battery.

The present invention has been made in order to solve the above-mentioned problems, and an object thereof is to provide a frame generation device, a reception device, a data transmission/reception system, a frame generation method, and a reception method which are capable of further reducing power consumption caused by the reception device.

Solution to Problem

A frame generation device according to the present invention, includes: a frame generation section for generating a frame including, in the following order: synchronization information being information for achieving synchronization with a reception device that receives information within the frame used for radio communications; address information indicating an address within the frame for transmitting data; and the data to be transmitted to the reception device; a presence/absence information generation section for generating distribution data presence/absence information indicating whether or not the data is included in the frame; and a synchronization information generation section for generating the synchronization information including the distribution data presence/absence information.

Further, a frame generation device according to the present invention, includes: a frame generation section for generating a frame including, in the following order: synchronization information being information for achieving synchronization with a reception device that receives information within the frame used for radio communications; address information indicating an address within the frame for transmitting data; and the data to be transmitted to the reception device; an address information transmission start information generation section for generating address information transmission start information indicating a timing at which transmission of the address information is started within the frame; and a synchronization information generation section for generating the synchronization information including the address information transmission start information.

Further, a reception device according to the present invention, includes: a reception section for receiving synchronization information, address information, and data, the synchronization information including distribution data presence/absence information indicating whether or not the data is included in a frame including, in the following order: the synchronization information being information for achieving synchronization with a transmission device that transmits the frame used for radio communications; the address information indicating an address within the frame for transmitting the data; and the data to be transmitted to the reception device; a determination section for determining based on the distribution data presence/absence information whether or not the address information is to be transmitted by the frame; and a power supply control section for controlling a power supply to the reception section, in which: the power supply control section supplies power to the reception section if the determination section determines that the address information is to be transmitted; and the power supply control section interrupts the power being supplied to the reception section if the determination section determines that the address information is not to be transmitted.

Further, a reception device according to the present invention, includes: a reception section for receiving synchronization information, address information, and data, the synchronization information including address information transmission start information indicating a timing at which transmission of the address information is started within a frame including, in the following order: the synchronization information being information for achieving synchronization with a transmission device that transmits the frame used for radio communications; the address information indicating the address within the frame for transmitting the data; and the data to be transmitted to the reception device; and a power supply control section for keeping interrupting a power supply to the reception section until the address information is transmitted, based on the address information transmission start information.

Further, a data transmission/reception system according to the present invention, includes: a frame generation device; a reception device; and a transmission device for transmitting a frame generated by the frame generation device to the reception device, in which: the frame generation device includes: a frame generation section for generating the frame including, in the following order: synchronization information being information for achieving synchronization with the reception device that receives information within the frame used for radio communications; address information indicating an address within the frame for transmitting data; and the data to be transmitted to the reception device; a presence/absence information generation section for generating distribution data presence/absence information indicating whether or not the data is included in the frame; and a synchronization information generation section for generating the synchronization information including the distribution data presence/absence information; the reception device includes: a reception section for receiving the synchronization information, the address information, and the data, the synchronization information including the distribution data presence/absence information indicating whether or not the data is included in the frame including, in the following order: the synchronization information being information for achieving synchronization with the transmission device that transmits the frame used for radio communications; the address information indicating the address within the frame for transmitting the data; and the data to be transmitted to the reception device; a determination section for determining, based on the distribution data presence/absence information, whether or not the address information is to be transmitted by the frame; and a power supply control section for controlling a power supply to the reception section; the power supply control section supplies power to the reception section if the determination section determines that the address information is to be transmitted; and the power supply control section interrupts the power being supplied to the reception section if the determination section determines that the address information is not to be transmitted.

Further, a data transmission/reception system according to the present invention, includes: a frame generation device; a reception device; and a transmission device for transmitting a frame generated by the frame generation device to the reception device, in which: the frame generation device includes: a frame generation section for generating a frame including, in the following order: synchronization information being information for achieving synchronization with the reception device that receives information within the frame used for radio communications; address information indicating an address within the frame for transmitting data; and the data to be transmitted to the reception device; an address information transmission start information generation section for generating address information transmission start information indicating a timing at which transmission of the address information is started within the frame; and a synchronization information generation section for generating the synchronization information including the address information transmission start information; and the reception device includes: a reception section for receiving the synchronization information, the address information, and the data, the synchronization information including the address information transmission start information indicating the timing at which the transmission of the address information is started within the frame including, in the following order: the synchronization information being information for achieving synchronization with the transmission device that transmits the frame used for radio communications; the address information indicating the address within the frame for transmitting the data; and the data to be transmitted to the reception device; and a power supply control section for keeping interrupting a power supply to the reception section until the address information is transmitted, based on the address information transmission start information.

Further, a frame generation method according to the present invention, includes: a frame generation step of generating a frame including, in the following order: synchronization information being information for achieving synchronization with a reception device that receives information within the frame used for radio communications; address information indicating an address within the frame for transmitting data; and the data to be transmitted to the reception device; a presence/absence information generation step of generating distribution data presence/absence information indicating whether or not the data is included in the frame; and a synchronization information generation step of generating the synchronization information including the distribution data presence/absence information.

Further, a frame generation method according to the present invention, includes: a frame generation step of generating a frame including, in the following order: synchronization information being information for achieving synchronization with a reception device that receives information within the frame used for radio communications; address information indicating an address within the frame for transmitting data; and the data to be transmitted to the reception device; an address information transmission start information generation step of generating address information transmission start information indicating a timing at which transmission of the address information is started within the frame; and a synchronization information generation step of generating the synchronization information including the address information transmission start information.

Further, a reception method according to the present invention is used for a reception device including a reception section, a determination section, and a power supply control section, the reception method including: a reception step of receiving, by the reception section, synchronization information, address information, and data, the synchronization information including distribution data presence/absence information indicating whether or not the data is included in a frame including, in the following order: the synchronization information being information for achieving synchronization with a transmission device that transmits the frame used for radio communications; the address information indicating an address within the frame for transmitting the data; and the data to be transmitted to the reception device; a determination step of determining, by the determination section, based on the distribution data presence/absence information, whether or not the address information is to be transmitted by the frame; and a power supply control step of controlling, by the power supply control section, a power supply to the reception section, in which: the power supply control step includes supplying power to the reception section if it is determined in the determination step that the address information is to be transmitted; and the power supply control step includes interrupting the power being supplied to the reception section if it is determined in the determination step that the address information is not to be transmitted.

Further, a reception method according to the present invention is used for a reception device including a reception section, a determination section, and a power supply control section, the reception method including: a reception step of receiving, by the reception section, synchronization information, address information, and data, the synchronization information including address information transmission start information indicating a timing at which transmission of the address information is started within a frame including, in the following order: the synchronization information being information for achieving synchronization with a transmission device that transmits the frame used for radio communications; the address information indicating the address within the frame for transmitting the data; and the data to be transmitted to the reception device; and a power supply control step of keeping interrupting a power supply to the reception section until the address information is transmitted, based on the address information transmission start information.

Advantageous Effects of Invention

The present invention is advantageous in that it is possible to further reduce power consumption caused by the reception device.

DESCRIPTION OF EMBODIMENTS

First Embodiment

Figure 1:
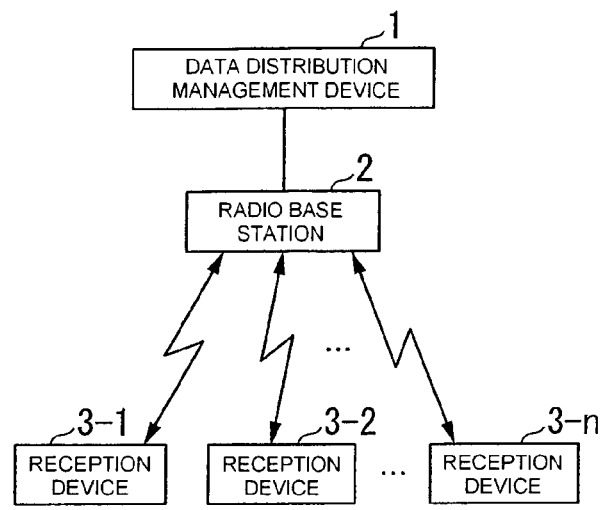
FIG. 1 A structural diagram illustrating a structure of a data transmission/reception system according to a first embodiment.

Hereinafter, a first embodiment of the present invention is described with reference to the drawings. FIG. 1 is a structural diagram illustrating a structure of a data transmission/reception system according to this embodiment. In the example illustrated in the figure, the data transmission/reception system includes a data distribution management device 1 (frame generation device), a radio base station 2 (transmission device), and reception devices 3 (3-1 to 3-n).

The data distribution management device 1 and the radio base station 2 are connected to each other by a wired or wireless network, and can transmit/receive information to/from each other. Further, the radio base station 2 is connected to one or a plurality of reception devices 3 by wireless networks, and can transmit/receive information to/from each other. In the example illustrated in the figure, the radio base station 2 is connected to the reception devices 3 by wireless networks, and can transmit/receive information to/from each other.

The data distribution management device 1 generates a frame to be transmitted to the reception devices 3 via the radio base station 2. The frame is described later. Further, the data distribution management device 1 manages a timing at which the created frame is transmitted to the reception devices 3.

The radio base station 2 transmits to the reception devices 3 the frame transmitted from the data distribution management device 1. The reception devices 3 receive information included in the frame transmitted from the data distribution management device 1 via the radio base station 2.

Note that, the data transmission/reception system according to this embodiment is, for example, an electronic shelf label system. Specifically, the reception devices 3 are electronic shelf labels each provided with a display section, and the data distribution management device 1 transmits information including trade names and commodity prices to be displayed in the display sections of the reception devices 3 to the reception devices 3 via the radio base station 2. Meanwhile, each of the reception devices 3 that have received the information including trade names and commodity prices transmitted from the data distribution management device 1 displays a trade name, a commodity price, and the like in its own display section based on the received information including trade names and commodity prices.

Figure 2:
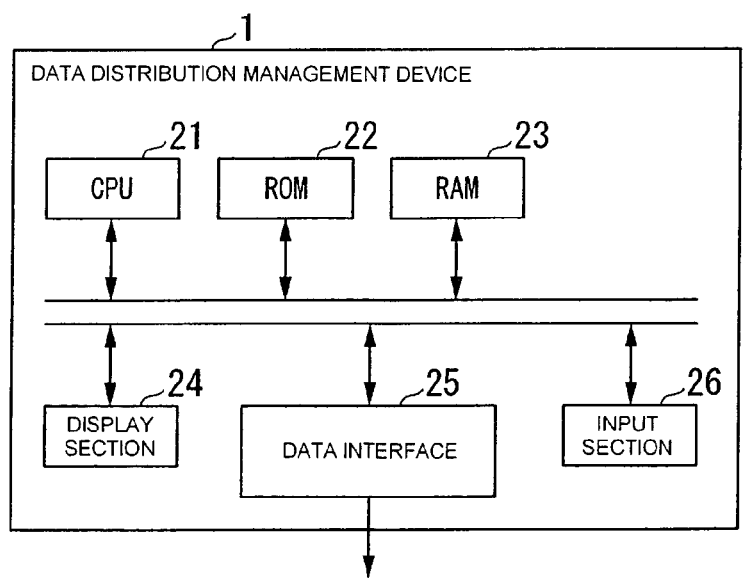
FIG. 2 A block diagram illustrating a physical configuration of a data distribution management device according to the first embodiment.

FIG. 2 is a block diagram illustrating a physical configuration of the data distribution management device 1 according to this embodiment. In the example illustrated in the figure, the data distribution management device 1 includes a central processing unit (CPU) 21, a read only memory (ROM) 22, a random access memory (RAM) 23, a display section 24, a data interface 25, and an input section 26.

The CPU 21 carries out a processing of the data distribution management device 1. The ROM 22 and the RAM 23 store information used by the data distribution management device 1. The display section 24 is, for example, a liquid crystal display or the like, and displays information therein. The data interface 25 performs transmission/reception of information to/from another device. The input section 26 receives an input to the data distribution management device 1.

Figure 3:
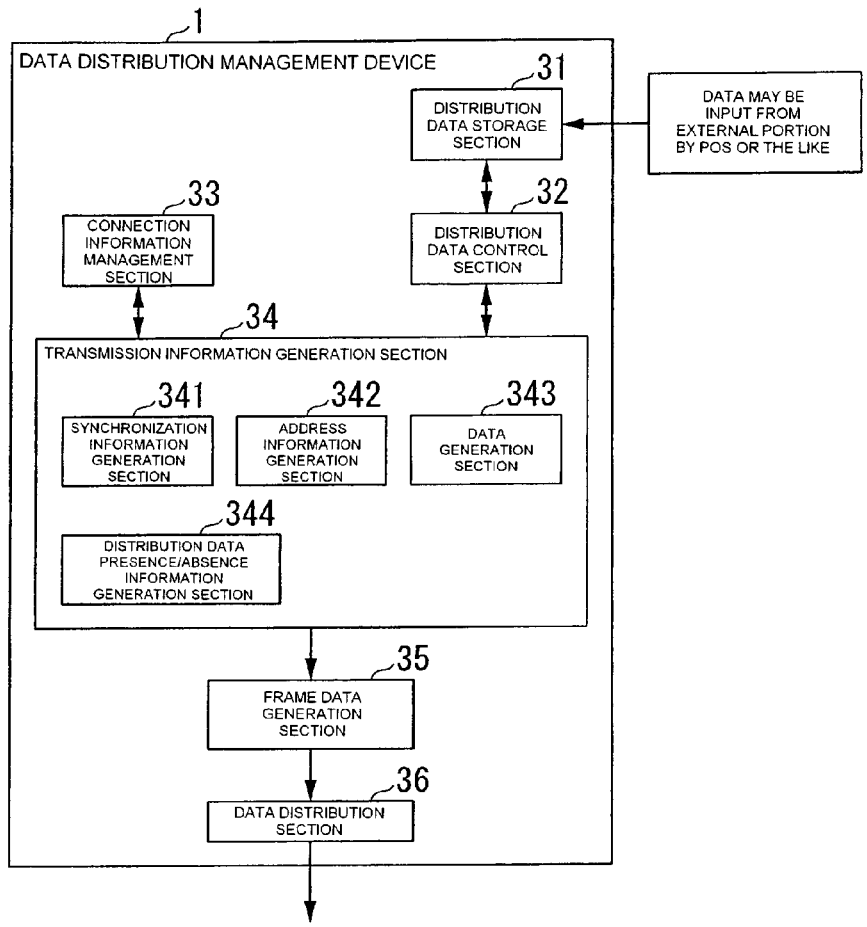
FIG. 3 A block diagram illustrating a functional configuration of the data distribution management device according to the first embodiment.

FIG. 3 is a block diagram illustrating a functional configuration of the data distribution management device 1 according to this embodiment. In the example illustrated in the figure, the data distribution management device 1 includes a distribution data storage section 31, a distribution data control section 32, a connection information management section 33, a transmission information generation section 34, a frame data generation section 35, and a data distribution section 36.

Further, the transmission information generation section 34 includes a synchronization information generation section 341, an address information generation section 342, a data generation section 343, and a distribution data presence/absence information generation section 344.

The distribution data storage section 31 stores information to be distributed to the reception devices 3. The distribution data control section 32 controls the information stored by the distribution data storage section 31. The connection information management section 33 manages information used for connection to the reception devices 3. The transmission information generation section 34 generates information to be transmitted to the reception devices 3. The frame data generation section 35 generates a frame based on the information generated by the transmission information generation section 34. The data distribution section 36 performs communications to the radio base station 2. The synchronization information generation section 341 generates synchronization information S described later. The address information generation section 342 generates address information A described later. The data generation section 343 generates data D described later. The distribution data presence/absence information generation section 344 generates distribution data presence/absence information H described later.

Figure 4:
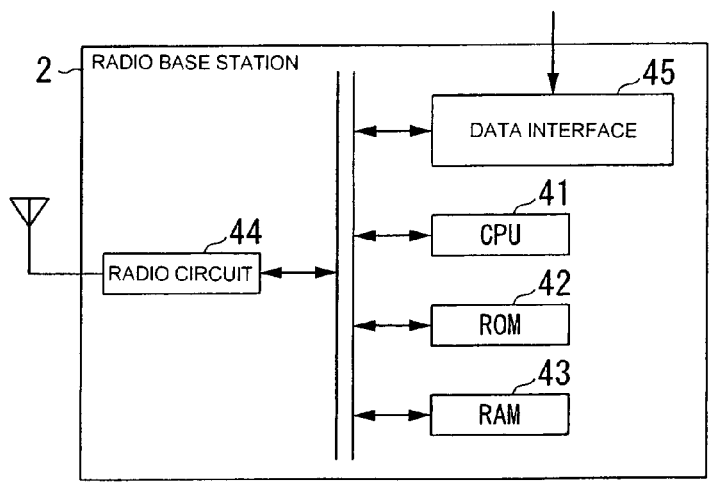
FIG. 4 A block diagram illustrating a physical configuration of a radio base station according to the first embodiment.

FIG. 4 is a block diagram illustrating a physical configuration of the radio base station 2 according to this embodiment. In the example illustrated in the figure, the radio base station 2 includes a CPU 41, a ROM 42, a RAM 43, a radio circuit 44, and a data interface 45.

The CPU 41 carries out a processing of the radio base station 2. The ROM 42 and the RAM 43 store information used by the radio base station 2. The radio circuit 44 performs transmission/reception of information to/from another device by radio communication. The data interface 45 performs transmission/reception of information to/from another device.

Figure 5:
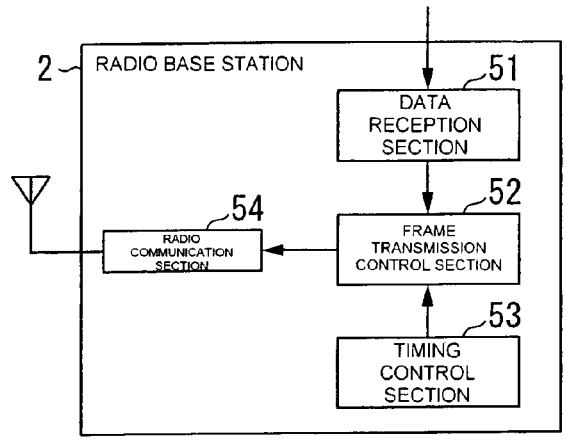
FIG. 5 A block diagram illustrating a functional configuration of the radio base station according to the first embodiment.

FIG. 5 is a block diagram illustrating a functional configuration of the radio base station 2 according to this embodiment. In the example illustrated in the figure, the radio base station 2 includes a data reception section 51, a frame transmission control section 52, a timing control section 53, and a radio communication section 54.

The data reception section 51 performs communications to the data distribution management device 1. The frame transmission control section 52 controls transmission of the frame to the reception devices 3. The timing control section 53 controls a timing to transmit information to the reception devices 3. The radio communication section 54 performs communications to the reception devices 3.

Figure 6:
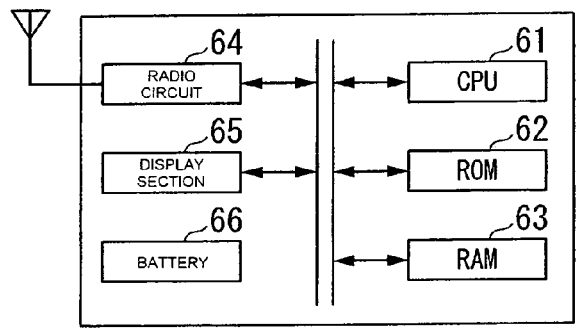
FIG. 6 A block diagram illustrating a physical configuration of a reception device according to the first embodiment.

FIG. 6 is a block diagram illustrating a physical configuration of the reception device 3 according to this embodiment. In the example illustrated in the figure, the reception device 3 includes a CPU 61, a ROM 62, a RAM 63, a radio circuit 64, a display section 65, and a battery 66.

The CPU 61 carries out a processing of the reception device 3. The ROM 62 and the RAM 63 store information used by the reception device 3. The radio circuit 64 performs transmission/reception of information to/from another device by radio communication. The display section 65 is, for example, a liquid crystal panel or the like, and displays information therein. The battery 66 supplies the reception device 3 with power used thereby.

Figure 7:
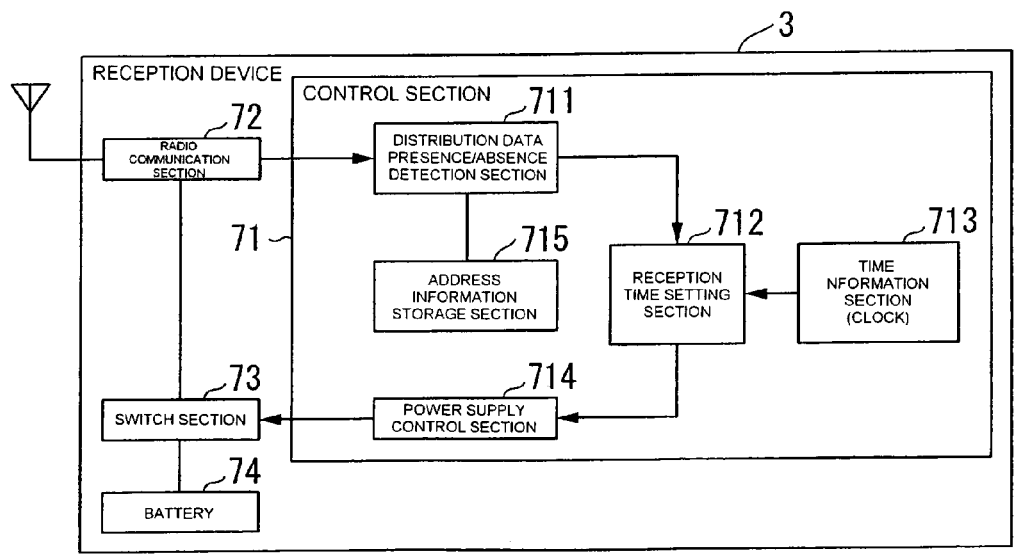
FIG. 7 A block diagram illustrating a functional configuration of the reception device according to the first embodiment.

FIG. 7 is a block diagram illustrating a functional configuration of the reception device 3 according to this embodiment. In the example illustrated in the figure, the reception device 3 includes a control section 71, a radio communication section 72, a switch section 73, and a battery 74.

Further, the control section 71 includes a distribution data presence/absence detection section 711, a reception time setting section 712, a time information section 713, a power supply control section 714, and an address information storage section 715.

The control section 71 performs control of communications to the radio base station 2. The radio communication section 72 includes a radio circuit, and performs communications to the radio base station 2. The switch section 73 is a switch for a current flowing through the radio circuit of the radio communication section 72. The battery 74 supplies the reception device 3 with power used thereby. The distribution data presence/absence detection section 711 detects whether or not the data D is to be transmitted from the radio base station 2. The reception time setting section 712 sets a time to receive information transmitted from the radio base station 2. The time information section 713 generates a time (clock). The power supply control section 714 uses the switch section 73 to control the current flowing through the radio circuit of the radio communication section 72. The address information storage section 715 stores address information specific to the self.

Figure 8:
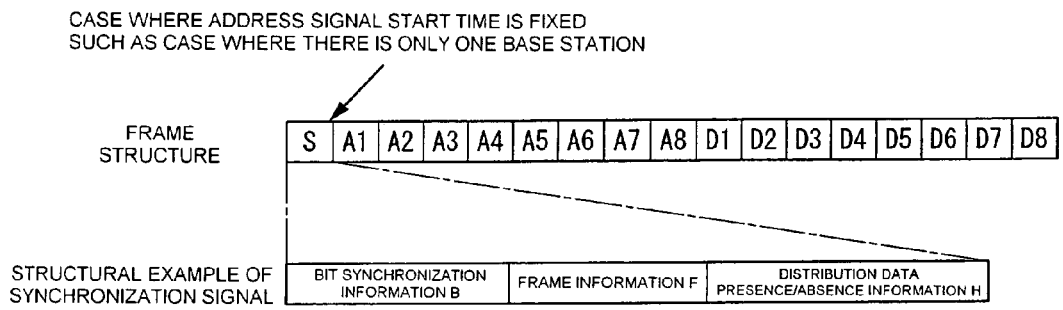
FIG. 8 A structural diagram illustrating a structure of a frame according to the first embodiment.

Next described is a structure of a frame according to this embodiment. FIG. 8 is a structural diagram illustrating the structure of the frame according to this embodiment. The frame includes the synchronization information S, the address information A, and the data D. In the example illustrated in the figure, there are eight reception devices 3-1 to 3-n of FIG. 1, and one frame includes the synchronization information S, address information items A1 to A8, and data items D1 to D8 in order. This indicates an example in a case of transmitting the data to eight reception devices identified by the address information items A1 to A8. Further, as a structural example of the synchronization information, in the example illustrated in the figure, the synchronization information S includes bit synchronization information B, frame information F, and the distribution data presence/absence information H.

The synchronization information S is information formed of the bit synchronization information B, the frame information F, and the distribution data presence/absence information H. The bit synchronization information B is information for achieving synchronization between the radio base station 2 and the reception devices 3. The frame information F is information for informing the reception devices 3 of the information on this frame transmitted by the radio base station 2. For example, the frame information F is information including ID information on the radio base station 2 and cycle information of the frame, which is necessary for the reception device 3 to operate in synchronization with the radio base station 2.

The distribution data presence/absence information H is information indicating whether or not the data D is included within this frame. For example, the distribution data presence/absence information is expressed by one bit. In a case where the data item D is included in this frame, the distribution data presence/absence information is "1", and in a case where the data D is not included in this frame, the distribution data presence/absence information is "0". Note that, the data amount of the distribution data presence/absence information H is as small an amount as possible (for example, one bit).

The address information A indicates an address of the reception device 3 within this frame in which the data D is to be transmitted. The data D is data to be transmitted to the reception device 3 indicated by the address information A within this frame. For example, in a case where the reception devices 3 are electronic shelf labels, the data D is the information including trade names and commodity prices.

Figure 9:
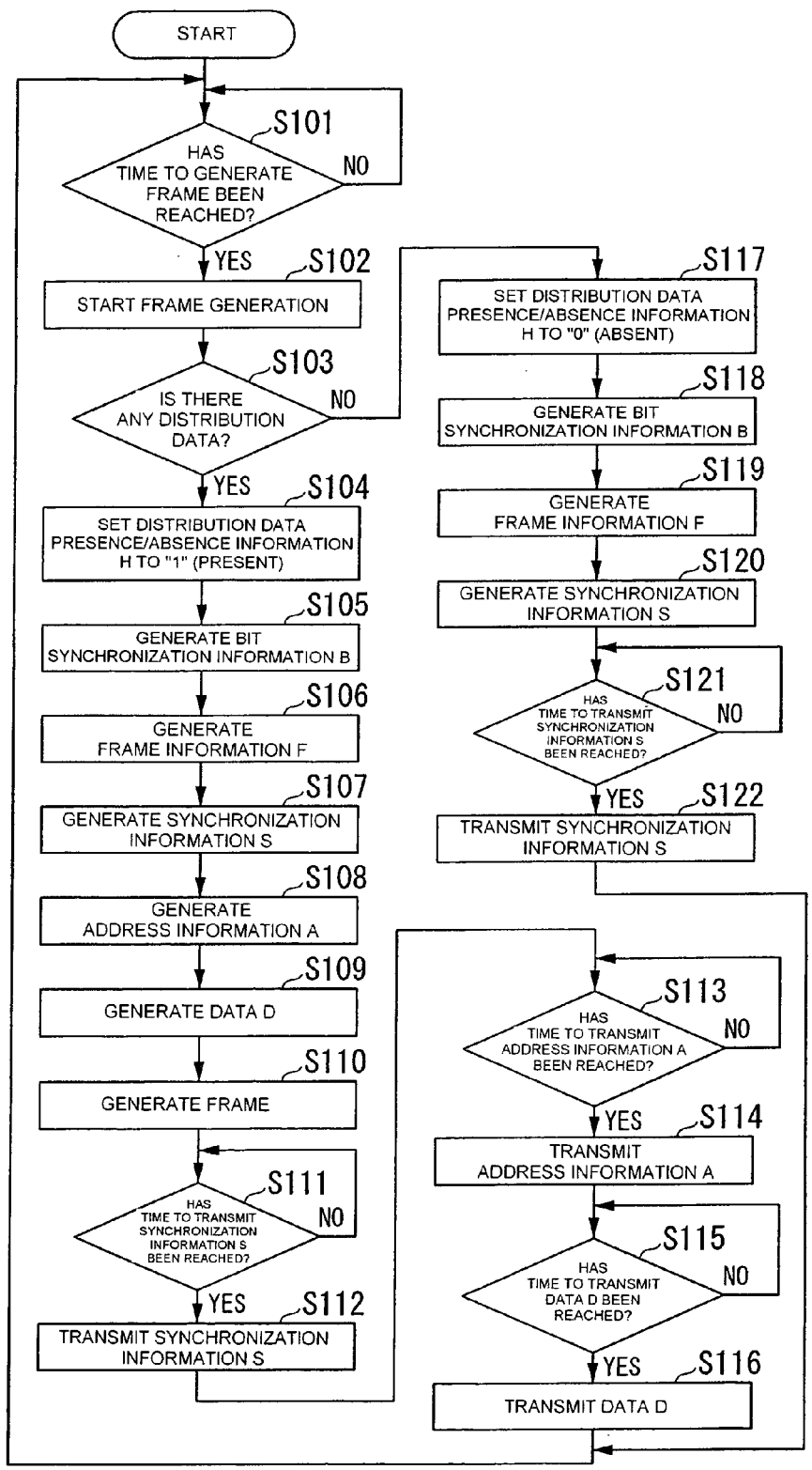
FIG. 9 A flowchart illustrating procedures for operations of the data distribution management device and the radio base station according to the first embodiment.

Next described are operations of the data distribution management device 1 and the radio base station 2 according to this embodiment. FIG. 9 is a flowchart illustrating procedures for the operations of the data distribution management device 1 and the radio base station 2 according to this embodiment.

(Step S101) The connection information management section 33 of the data distribution management device 1 determines whether or not a time to generate a frame has been reached. If it is determined that the time to generate a frame has been reached, the procedure advances to Step S102, or otherwise returns to the processing of Step S101.

(Step S102) The frame data generation section 35 of the data distribution management device 1 starts to generate a frame. After that, the procedure advances to Step S103.

(Step S103) The distribution data control section 32 of the data distribution management device 1 determines whether or not there is data to be distributed in the distribution data storage section 31. If it is determined that there is data to be distributed, the procedure advances to Step S104, or otherwise advances to Step S117.

(Step S104) The distribution data presence/absence information generation section 344 of the data distribution management device 1 generates the distribution data presence/absence information H. It is determined in Step S103 that there is data to be distributed, and hence the value of the distribution data presence/absence information H generated by the distribution data presence/absence information generation section 344 is "1". After that, the procedure advances to Step S105.

(Step S105) The synchronization information generation section 341 of the data distribution management device 1 generates the bit synchronization information B. After that, the procedure advances to Step S106.

(Step S106) The synchronization information generation section 341 of the data distribution management device 1 generates the frame information F. After that, the procedure advances to Step S107.

(Step S107) The synchronization information generation section 341 of the data distribution management device 1 generates the synchronization information S based on the distribution data presence/absence information H, the bit synchronization information B, and the frame information F that are generated in Step S104 to Step S106. After that, the procedure advances to Step S108.

(Step S108) The address information generation section 342 of the data distribution management device 1 generates the address information A. After that, the procedure advances to Step S109.

(Step S109) The data generation section 343 of the data distribution management device 1 generates the data D. After that, the procedure advances to Step S110.

(Step S110) The frame data generation section 35 of the data distribution management device 1 generates the frame based on the synchronization information S, the address information A, and the data D that are generated in Step S107 to Step S109. Further, the data distribution section 36 of the data distribution management device 1 transmits the generated frame to the radio base station 2. The data reception section 51 of the radio base station 2 receives the frame transmitted from the data distribution management device 1. After that, the procedure advances to Step S111.

(Step S111) The timing control section 53 of the radio base station 2 determines whether or not a time to transmit the synchronization information S has been reached. If it is determined that the time to transmit the synchronization information S has been reached, the procedure advances to Step S112, or otherwise returns to Step S111.

(Step S112) The frame transmission control section 52 of the radio base station 2 transmits the synchronization information S of the frame received in Step S110 to the reception devices 3 via the radio communication section 54. After that, the procedure advances to Step S113.

(Step S113) The timing control section 53 of the radio base station 2 determines whether or not a time to transmit the address information A has been reached. If it is determined that the time to transmit the address information A has been reached, the procedure advances to Step S114, or otherwise returns to Step S113.

(Step S114) The frame transmission control section 52 of the radio base station 2 transmits the address information A of the frame received in Step S110 to the reception devices 3 via the radio communication section 54. After that, the procedure advances to Step S115.

(Step S115) The timing control section 53 of the radio base station 2 determines whether or not a time to transmit the data D has been reached. If it is determined that the time to transmit the data D has been reached, the procedure advances to Step S116 or otherwise returns to Step S115

(Step S116) The frame transmission control section 52 of the radio base station 2 transmits the data D of the frame received in Step S110 to the reception devices 3 via the radio communication section 54. After that, the procedure returns to Step S101.

(Step S117) The distribution data presence/absence information generation section 344 of the data distribution management device 1 generates the distribution data presence/absence information H. It is determined in Step S103 that there is no data to be distributed, and hence the value of the distribution data presence/absence information H generated by the distribution data presence/absence information generation section 344 is set to "0". After that, the procedure advances to Step S118.

(Step S118) The synchronization information generation section 341 of the data distribution management device 1 generates the bit synchronization information B. After that, the procedure advances to Step S119.

(Step S119) The synchronization information generation section 341 of the data distribution management device 1 generates the frame information F. After that, the procedure advances to Step S120.

(Step S120) The synchronization information generation section 341 of the data distribution management device 1 generates the synchronization information S based on the distribution data presence/absence information H, the bit synchronization information B, and the frame information F that are generated in Step S117 to Step S119. Further, the data distribution section 36 of the data distribution management device 1 transmits the generated synchronization information S to the radio base station 2. The data reception section 51 of the radio base station 2 receives the synchronization information S transmitted from the data distribution management device 1. After that, the procedure advances to Step S121.

(Step S121) The timing control section 53 of the radio base station 2 determines whether or not a time to transmit the synchronization information S has been reached. If it is determined that the time to transmit the synchronization information S has been reached, the procedure advances to Step S122, or otherwise returns to Step S121.

(Step S122) The frame transmission control section 52 of the radio base station 2 transmits the synchronization information S received in Step S120 to the reception devices 3 via the radio communication section 54. After that, the procedure returns to Step S101.

As described above, the data distribution management device 1 according to this embodiment can generate the synchronization information S including the distribution data presence/absence information H. Further, the radio base station 2 according to this embodiment can transmit the synchronization information S including the distribution data presence/absence information H to the reception devices 3.

Figure 10:
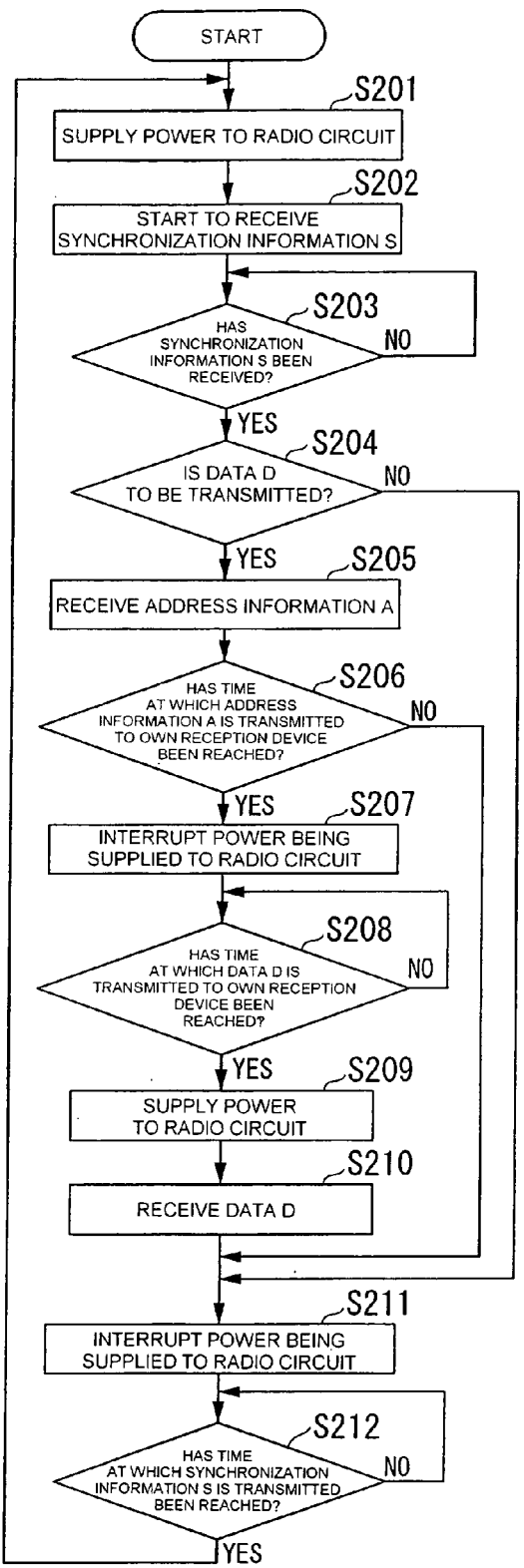
FIG. 10 A flowchart illustrating a procedure for an operation of the reception device according to the first embodiment.

Next described is an operation of the reception device 3 according to this embodiment. FIG. 10 is a flowchart illustrating a procedure for the operation of the reception device 3 according to this embodiment.

(Step S201) The power supply control section 714 of the reception device 3 controls the switch section 73 to supply power to the radio circuit of the radio communication section 72. After that, the procedure advances to Step S202.

(Step S202) The radio communication section 72 of the reception device 3 starts to receive the synchronization information S transmitted from radio base station 2. After that, the procedure advances to Step S203.

(Step S203) The distribution data presence/absence detection section 711 of the reception device 3 determines whether or not the radio communication section 72 has received the synchronization information S. If it is determined that the synchronization information S has been received, the procedure advances to Step S204, or otherwise returns to Step S203.

(Step S204) The distribution data presence/absence detection section 711 of the reception device 3 determines whether or not the data D is to be transmitted from the radio base station 2 based on the distribution data presence/absence information H included in the synchronization information S received by the radio communication section 72. Specifically, if the value of the distribution data presence/absence information H is "1", the reception device 3 determines that the data D is to be transmitted from the radio base station 2. If the value of the distribution data presence/absence information H is "0", it is determined that the data D is not to be transmitted from the radio base station 2. If it is determined that the transmission is to be performed, the procedure advances to Step S205, or otherwise advances to Step S211.

(Step S205) The radio communication section 72 of the reception device 3 receives the address information A transmitted from the radio base station 2. After that, the procedure advances to Step S206.

(Step S206) The distribution data presence/absence detection section 711 of the reception device 3 determines whether or not the address information A addressed to the own reception device is included in the address information A received in Step S205. If it is determined that the address information A addressed to the own reception device is included, the procedure advances to Step S207, or otherwise advances to Step S211.

(Step S207) After receiving the address information A transmitted to the own reception device, the power supply control section 714 of the reception device 3 controls the switch section 73 to temporarily interrupt the power being supplied to the radio circuit of the radio communication section 72. With regard to the timing to interrupt the power supply, there may be a method in which a timing to transmit the address information A to be transmitted to the own reception device is set in advance and the power supply control section 714 is controlled according to the timing, a method in which information indicating the end of transmission is inserted into the last part of the address information A addressed to the own reception device for the transmission and the information is detected by the reception device 3 to control the power supply control section 714, and other such methods. After that, the procedure advances to Step S208.

(Step S208) The reception time setting section 712 of the reception device 3 determines whether or not a time at which the data D is transmitted from the radio base station 2 to the own reception device 3 has been reached. If it is determined that the time for the transmission has been reached, the procedure advances to Step S209, or otherwise returns to Step S208.

(Step S209) The power supply control section 714 of the reception device 3 controls the switch section 73 to supply power to the radio circuit of the radio communication section 72. After that, the procedure advances to Step S210.

(Step S210) The radio communication section 72 of the reception device 3 receives the data D transmitted from the radio base stations 2 to the own reception device. After that, the procedure advances to Step S211.

(Step S211) The power supply control section 714 of the reception device 3 controls the switch section 73 to interrupt the power being supplied to the radio circuit of the radio communication section 72. After that, the procedure advances to Step S212.

(Step S212) The reception time setting section 712 of the reception device 3 determines whether or not a time at which the synchronization information S is transmitted from the radio base station 2 has been reached. If it is determined that the time for the transmission has been reached, the procedure returns to Step S201, or otherwise returns to Step S212.

Figure 11:
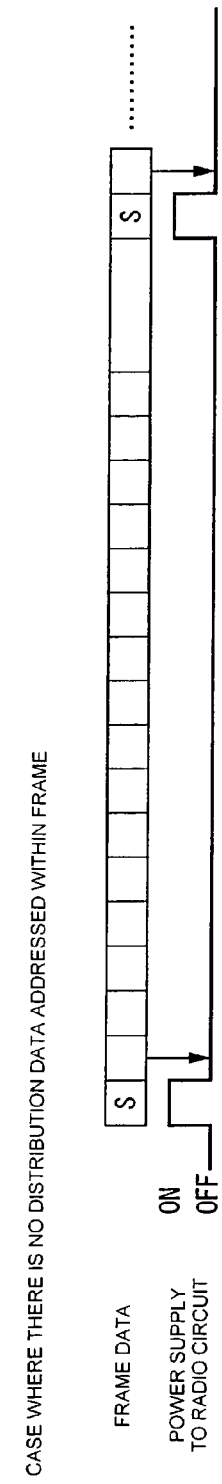
FIG. 11 A diagram illustrating on/off timings of power supplied to a radio circuit of the reception device according to the first embodiment.

Next, FIG. 11 is referenced to describe a specific example of on/off timings of power supplied to the radio circuit of the reception device 3 in a case where the data D is not included in the frame (the data D is not to be transmitted from the radio base station 2).

FIG. 11 is a diagram illustrating the on/off timings of the power supplied to the radio circuit within the radio communication section 72 of the reception device 3 according to this embodiment. FIG. 11 illustrates the on/off timings of the power supplied to the radio circuit of the reception device 3 in terms of the timing at which the information included in the frame is transmitted from the radio base station 2.

In the example illustrated in the figure, the power is supplied to the radio circuit of the reception device 3 at timings at which the synchronization information S within the frame is transmitted from the radio base station 2. Further, the power is not supplied to the radio circuit of the reception device 3 in a time period other than the timings at which the synchronization information S within the frame is transmitted from the radio base station 2.

Figure 12:
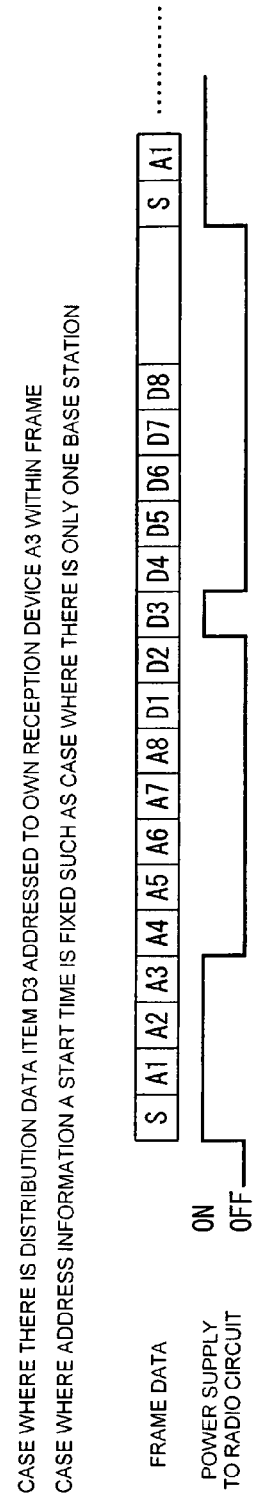
FIG. 12 A diagram illustrating on/off timings of the power supplied to the radio circuit of the reception device according to the first embodiment.

FIG. 12 is referenced to describe a specific example of on/off timings of the power supplied to the radio circuit of the reception device 3 in a case where the data D is included in the frame (the data D is to be transmitted from the radio base station 2).

FIG. 12 is a diagram illustrating the on/off timings of the power supplied to the radio circuit of the reception device 3-3 whose address information is A3 among the reception devices 3-1 to 3-$n$ according to this embodiment.

Note that, in the example illustrated in FIG. 12, the address information A to be transmitted to the own reception device 3-3 is A3, and the data D is D3.

In the example illustrated in the figure, the power is kept being supplied to the radio circuit within the radio communication section 72 of the reception device 3-3 until the transmission of the address information item A3 within the frame to be transmitted to the reception device 3-3 is completed after the synchronization information S within the frame is transmitted from the radio base station 2. When the reception of the address information item A3 within the frame is completed, the reception device 3-3 keeps interrupting the power supply to the radio communication section 72 until the transmission of the data item D3 is started. After that, the power is supplied to the radio circuit within the radio communication section 72 of the reception device 3-3 at the timing at which the data item D3 addressed to the reception device 3-3 is transmitted from the radio base station 2. The power supply to the radio circuit within the radio communication section 72 of the reception device 3-3 is kept being interrupted until the subsequent synchronization information S is transmitted from the radio base station 2 after the transmission of the data item D3 within the frame is completed.

As described above, the reception device 3 according to this embodiment receives the synchronization information S including the distribution data presence/absence information H, and determines whether or not the data D is to be transmitted based on the received distribution data presence/absence information H, and if it is determined that the transmission is not to be performed, the power supply control section 714 interrupts the power being supplied to the radio circuit of the radio communication section 72. This can further reduce the power consumption caused by the reception device 3. Further, the battery provided to the reception device 3 can be made to last longer.

Second Embodiment

Figure 13:
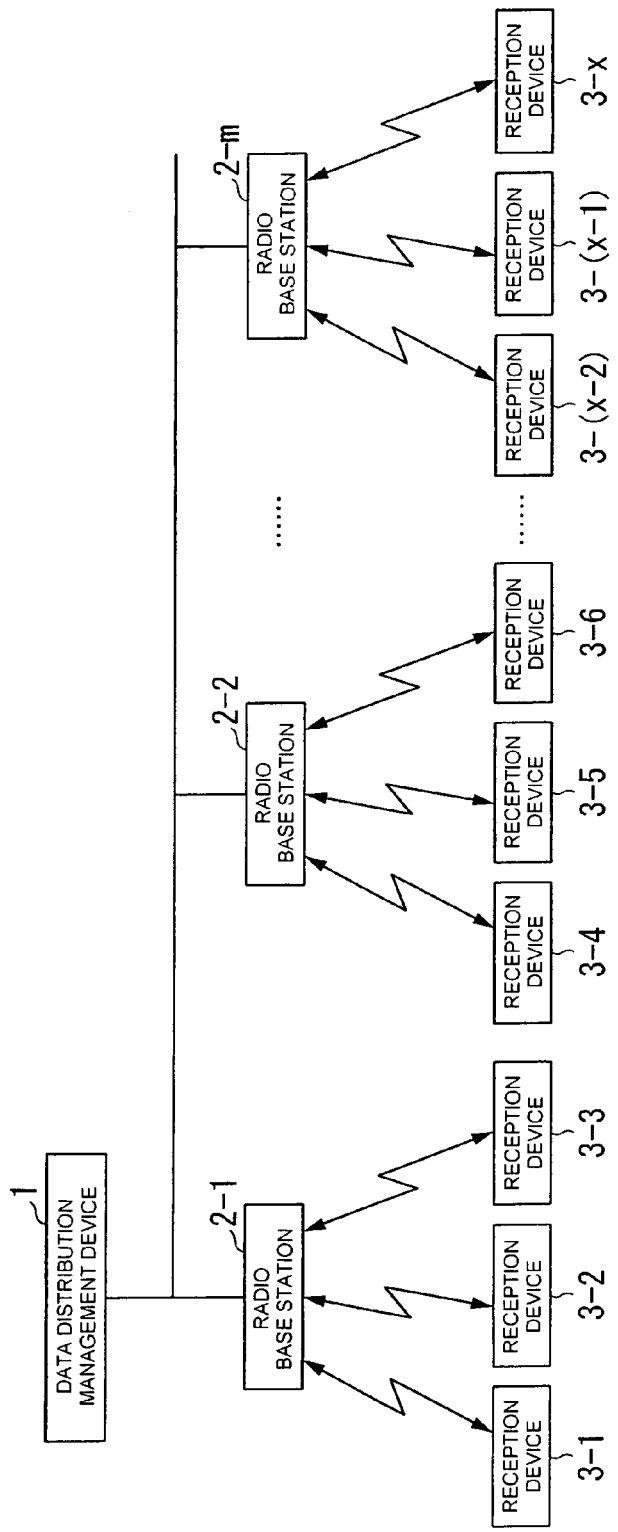
FIG. 13 A structural diagram illustrating a structure of a data transmission/reception system according to a second embodiment.

Next, a second embodiment of the present invention is described with reference to the drawings. FIG. 13 is a structural diagram illustrating a structure of a data transmission/reception system according to this embodiment. In the example illustrated in the figure, the data transmission/reception system includes the data distribution management device 1 (frame generation device), the radio base stations 2 (2-1 to 2-$m$) (transmission device), and reception devices 3 (3-1 to 3-$x$).

The data distribution management device 1 and the radio base stations 2 are connected to each other by a wired or wireless network, and can transmit/receive information to/from each other. Further, the radio base stations 2 are each connected to one or a plurality of reception devices 3 by wireless networks, and can transmit/receive information to/from each other. In the example illustrated in the figure, the radio base station 2-1 is connected to the reception devices 3-1 to 3-3 by wireless networks, and can transmit/receive information to/from each other. The other radio base stations 2-2 to 2-$m$ are connected as is illustrated in the figure.

The data distribution management device 1 generates a frame to be transmitted to the reception devices 3 via the radio base stations 2. The frame is described later. Further, the data distribution management device 1 manages a timing at which the created frame is transmitted to the reception devices 3.

The radio base stations 2 transmit to the reception devices 3 the frame transmitted from the data distribution management device 1. The reception devices 3 receive information included in the frame transmitted from the data distribution management device 1 via the radio base stations 2.

Note that, the data transmission/reception system according to this embodiment is, for example, an electronic shelf label system in the same manner as in the first embodiment. Specifically, the reception devices 3 are electronic shelf labels each provided with a display section, and the data distribution management device 1 transmits information including trade names and commodity prices to be displayed in the display sections of the reception devices 3 to the reception devices 3 via the radio base stations 2. Meanwhile, each of the reception devices 3 that have received the information including trade names and commodity prices transmitted from the data distribution management device 1 displays a trade name, a commodity price, and the like in its own display section based on the received information including trade names and commodity prices.

The physical configuration of the data distribution management device 1 according to this embodiment is the same as the physical configuration of the data distribution management device 1 according to the first embodiment.

Figure 14:
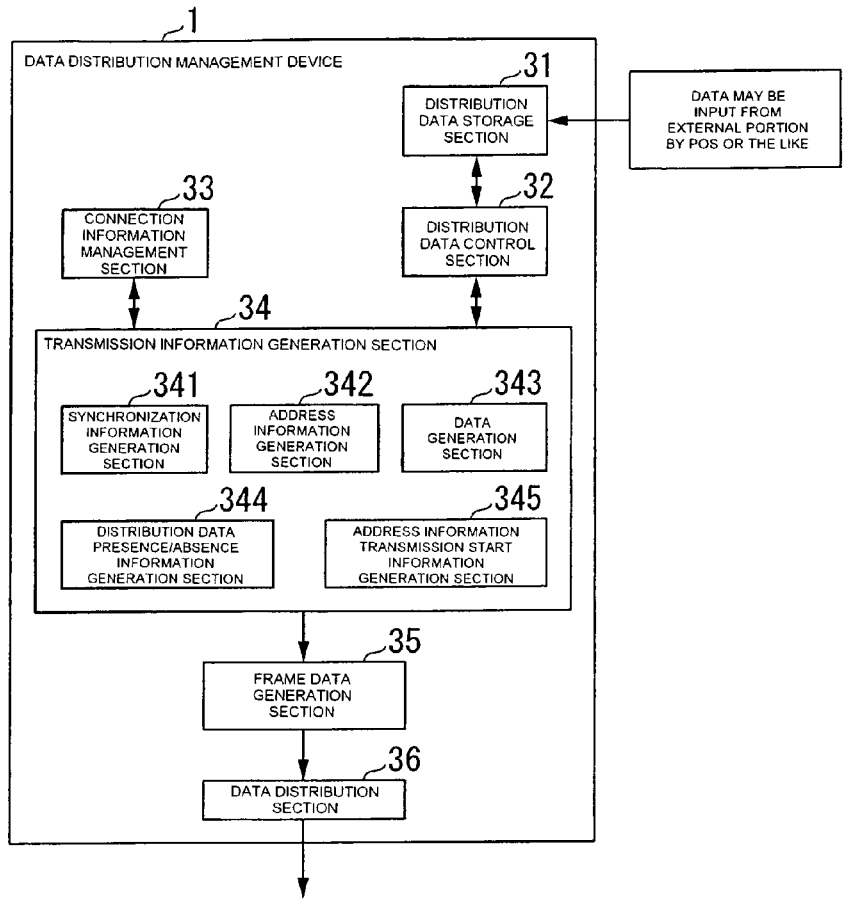
FIG. 14 A block diagram illustrating a functional configuration of a data distribution management device according to the second embodiment.

FIG. 14 is a block diagram illustrating a functional configuration of the data distribution management device 1 according to this embodiment. In the example illustrated in the figure, the data distribution management device 1 includes the distribution data storage section 31, the distribution data control section 32, the connection information management section 33, the transmission information generation section 34, the frame data generation section 35, and the data distribution section 36.

Further, the transmission information generation section 34 includes the synchronization information generation section 341, the address information generation section 342, the data generation section 343, the distribution data presence/absence information generation section 344, and an address information transmission start information generation section 345.

The distribution data storage section 31, the distribution data control section 32, the connection information management section 33, the transmission information generation section 34, the frame data generation section 35, the data distribution section 36, the synchronization information generation section 341, the address information generation section 342, and the data generation section 343 are the same as the respective sections according to the first embodiment. The address information transmission start information generation section 345 generates address information transmission start information At described later.

The physical configurations of the radio base stations 2 according to this embodiment are the same as the physical configuration of the radio base station 2 according to the first embodiment.

Figure 15:
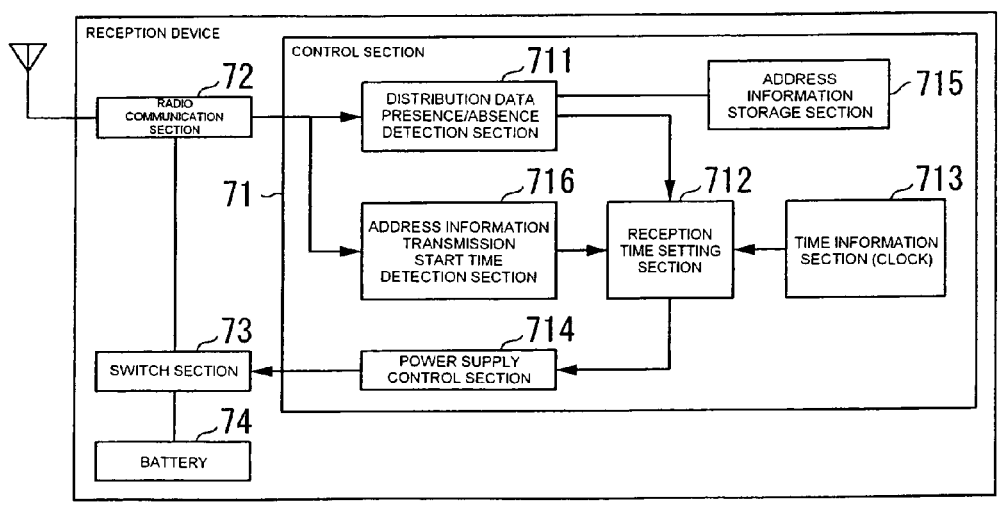
FIG. 15 A block diagram illustrating a functional configuration of a reception device according to the second embodiment.

FIG. 15 is a block diagram illustrating a functional configuration of the reception device 3 according to this embodiment. In the example illustrated in the figure, the reception device 3 includes the control section 71, the radio communication section 72, the switch section 73, and the battery 74.

Further, the control section 71 includes the distribution data presence/absence detection section 711, the reception time setting section 712, the time information section 713, the power supply control section 714, the address information storage section 715, and an address information transmission start time detection section 716.

Figure 16:
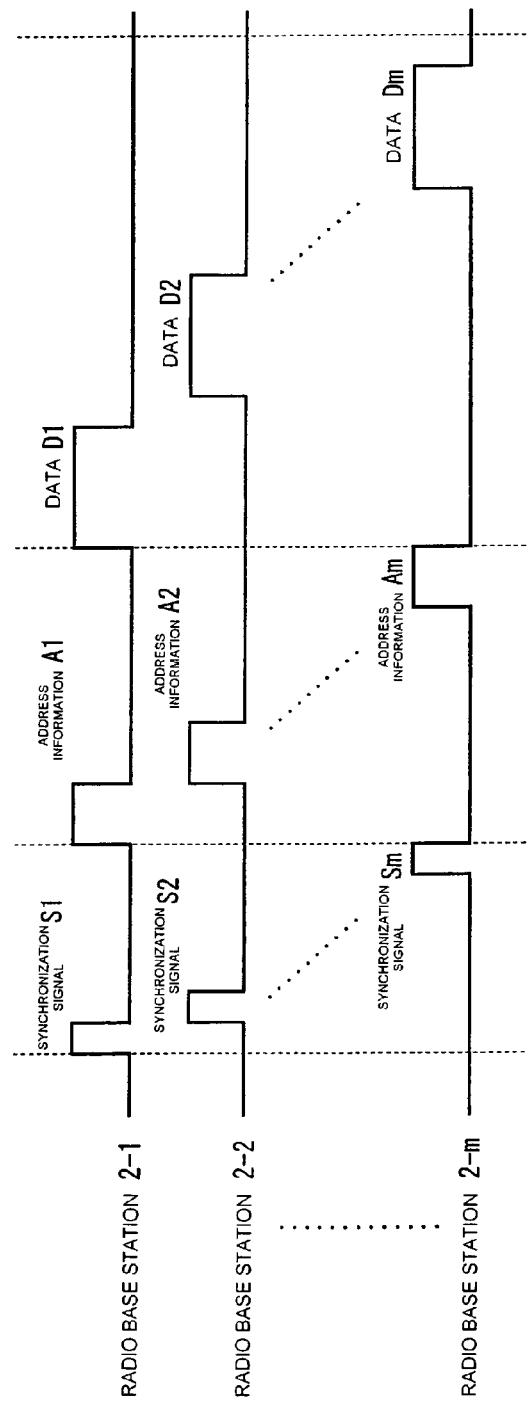
FIG. 16 A diagram illustrating timings at which radio base stations transmit information according to the second embodiment.

The control section 71, the radio communication section 72, the switch section 73, the battery 74, the distribution data presence/absence detection section 711, the reception time setting section 712, the time information section 713, the power supply control section 714, and the address information storage section 715 are the same as the respective sections according to the first embodiment. The address information transmission start time detection section 716 detects a time at which the address information A is transmitted from the radio base stations 2. For example, the respective radio base stations 2 transmit the synchronization information S in order. FIG. 16 is a diagram illustrating timings at which the radio base stations 2-1 to 2-$m$ transmit information. In the example illustrated in the figure, after the radio base station 2-1 transmits a synchronization information item S1, the radio base station 2-2 then transmits a synchronization information item S2 at a timing that does not overlap with a synchronization signal S1.

After all the radio base stations 2 have transmitted the synchronization information S in order and after the last radio base station 2-$m$ has transmitted a synchronization signal Sm, the respective radio base stations 2-1 to 2-$m$ transmit address information items A1 to Am in order at timings that do not overlap with one another. For example, after the radio base station 2-1 transmits the synchronization information item S1, the radio base station 2-2 then transmits the synchronization information S. After all the radio base stations 2 transmit the synchronization information S in order, the radio base station 2-1 transmits the address information item A1.

After all the radio base stations 2 have transmitted the address information A in order and after the last radio base station 2-$m$ has transmitted an address signal Am, the respective radio base stations 2-1 to 2-$m$ transmit data items D1 to Dm in order at timings that do not overlap with one another. The control of the transmission of those information signals is performed by the data distribution management device 1. For example, after all the radio base stations 2 transmit the address information A in order, the radio base station 2-1 transmits the data item D1. In the same manner, all the radio base stations 2 transmit the data D in order.

Figure 17:
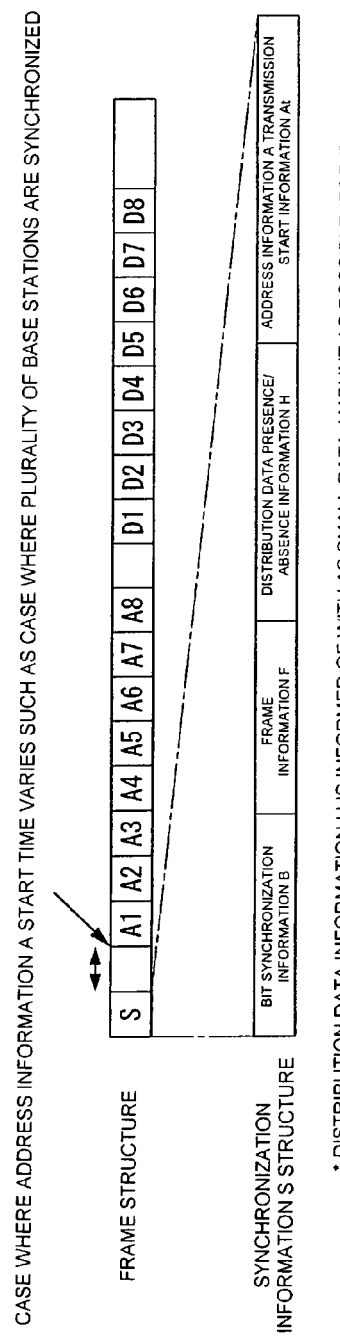
FIG. 17 A structural diagram illustrating a structure of a frame according to the second embodiment.

Next described is a structure of a frame according to this embodiment. FIG. 17 is a structural diagram illustrating the structure of the frame according to this embodiment. The frame includes the synchronization information S, the address information A, and the data D.

In the example illustrated in the figure, there are eight reception devices 3-1 to 3-$x$ of FIG. 13, and one frame includes the synchronization information S, address information items A1 to A8, and data items D1 to D8.

In this embodiment, there are intervals between the completion of the transmission of the synchronization information S and the start of the transmission of the address information A. Further, there are intervals between the completion of the transmission of the address information A and the start of the transmission of the data D.

Those intervals are set for the transmission/reception of a plurality of synchronization information items S1 to Sm transmitted by the plurality of radio base stations 2-1 to 2-$m$ within the data transmission/reception system illustrated in FIG. 13 and for the transmission/reception of address information items A1 to Am addressed to the plurality of reception devices 3-1 to 3-$x$. The interval varies according to the number of installed radio base stations 2 and the number of installed reception devices 3.

As a structural example of the synchronization information, in the example illustrated in FIG. 17, the synchronization information S includes the bit synchronization information B, the frame information F, the distribution data presence/absence information H, and address information transmission start information At.

Note that, in the above description, the plurality of radio base stations 2-1 to 2-$m$ may be configured so that while one radio base station is transmitting the synchronization information S, the address information A, and the data D, the other radio base stations do not perform the transmission. Further, this control is performed by the data distribution management device 1.

The synchronization information S is information formed of the bit synchronization information B, the frame information F, the distribution data presence/absence information H, and the address information transmission start information At. The bit synchronization information B is information for achieving synchronization between the radio base station 2 and the reception devices 3. The frame information F is information for informing the reception devices 3 of the information on this frame transmitted by the radio base station 2. For example, the frame information F is information including ID information on the radio base station 2 and cycle information of the frame, which is necessary for the reception device 3 to operate in synchronization with the radio base stations 2.

The address information transmission start information At is information indicating a timing at which the transmission of the address information A is started within the frame.

The distribution data presence/absence information H is information indicating whether or not the data D is included within this frame. For example, the distribution data presence/absence information is expressed by one bit, and is "1" in a case where the data D is included in this frame or "0" in a case where the data D is not included in this frame. Note that, the data amount of the distribution data presence/absence information H is as small an amount as possible (for example, one bit). Further, if the address information transmission start information At is not set, the distribution data presence/absence information H may also be omitted by determining that no distribution data is included in the frame.

The address information A indicates an address within this frame to which the data D is to be transmitted. The data D is data to be transmitted to the reception device 3. For example, in a case where the reception device 3 is an electronic shelf label, the data D is the information including trade names and commodity prices.

Figure 18:
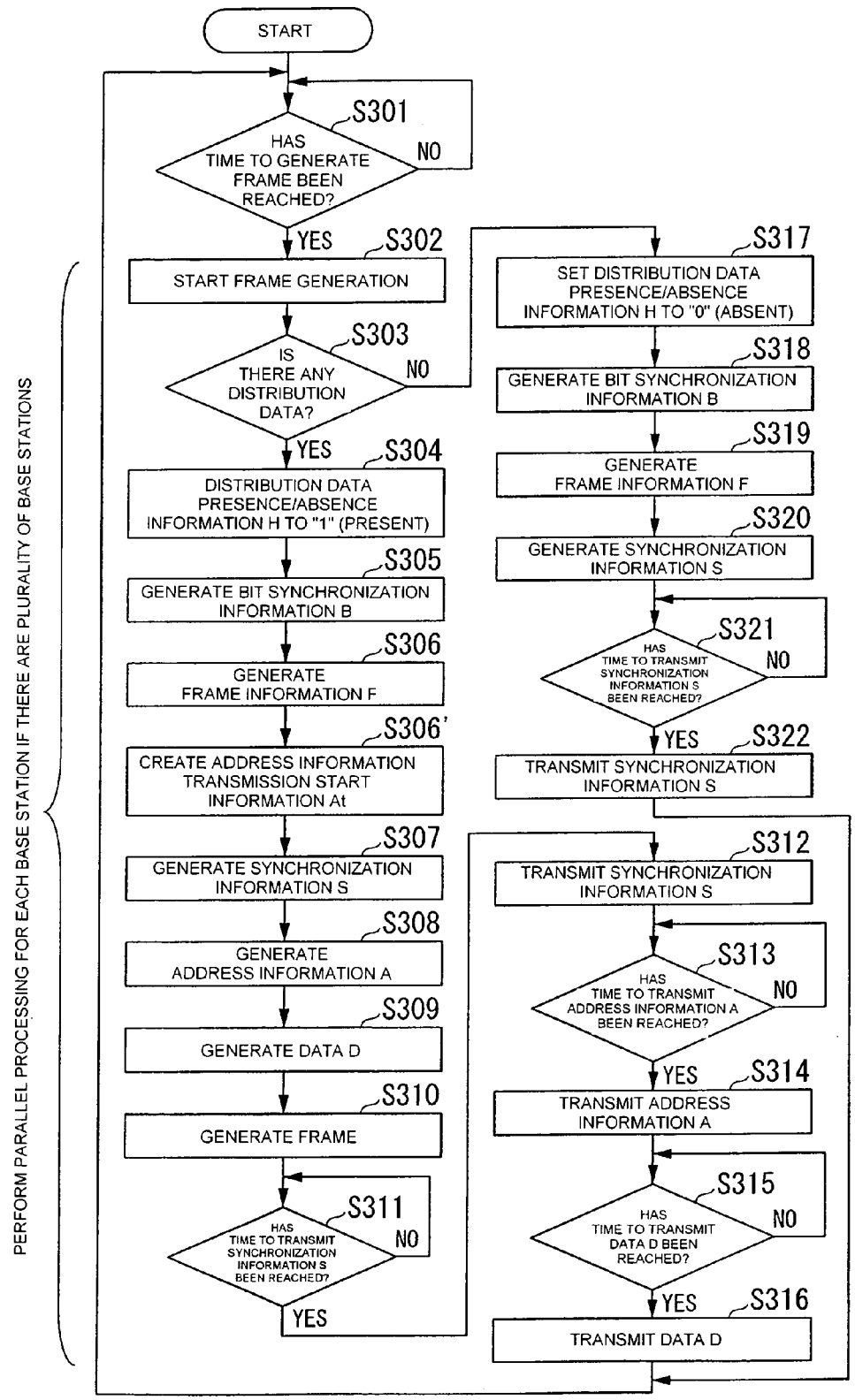
FIG. 18 A flowchart illustrating procedures for operations of the data distribution management device and the radio base station according to the second embodiment.

Next described are operations of the data distribution management device 1 and the radio base station 2 according to this embodiment. FIG. 18 is a flowchart illustrating procedures for the operations of the data distribution management device 1 and the radio base station 2 according to this embodiment.

The processing of Step S301 to Step S306 is the same as the processing of Step S101 to Step S106 according to the first embodiment.

(Step S306') The address information transmission start information generation section 345 of the data distribution management device 1 generates the address information transmission start information At. After that, the procedure advances to Step S307.

(Step S307) The synchronization information generation section 341 of the data distribution management device 1 generates the synchronization information S based on the distribution data presence/absence information H, the bit synchronization information B, the frame information F, and the address information transmission start information At that are generated in Step S304 to Step S306'. After that, the procedure advances to Step S308.

The processing of Step S308 to Step S322 is the same as the processing of Step S108 to Step S122 according to the first embodiment.

As described above, the data distribution management device 1 according to this embodiment can generate the synchronization information S including the address information transmission start information At, and the radio base station 2 according to this embodiment can transmit the synchronization information S including the address information transmission start information At to the reception device 3.

Figure 19:
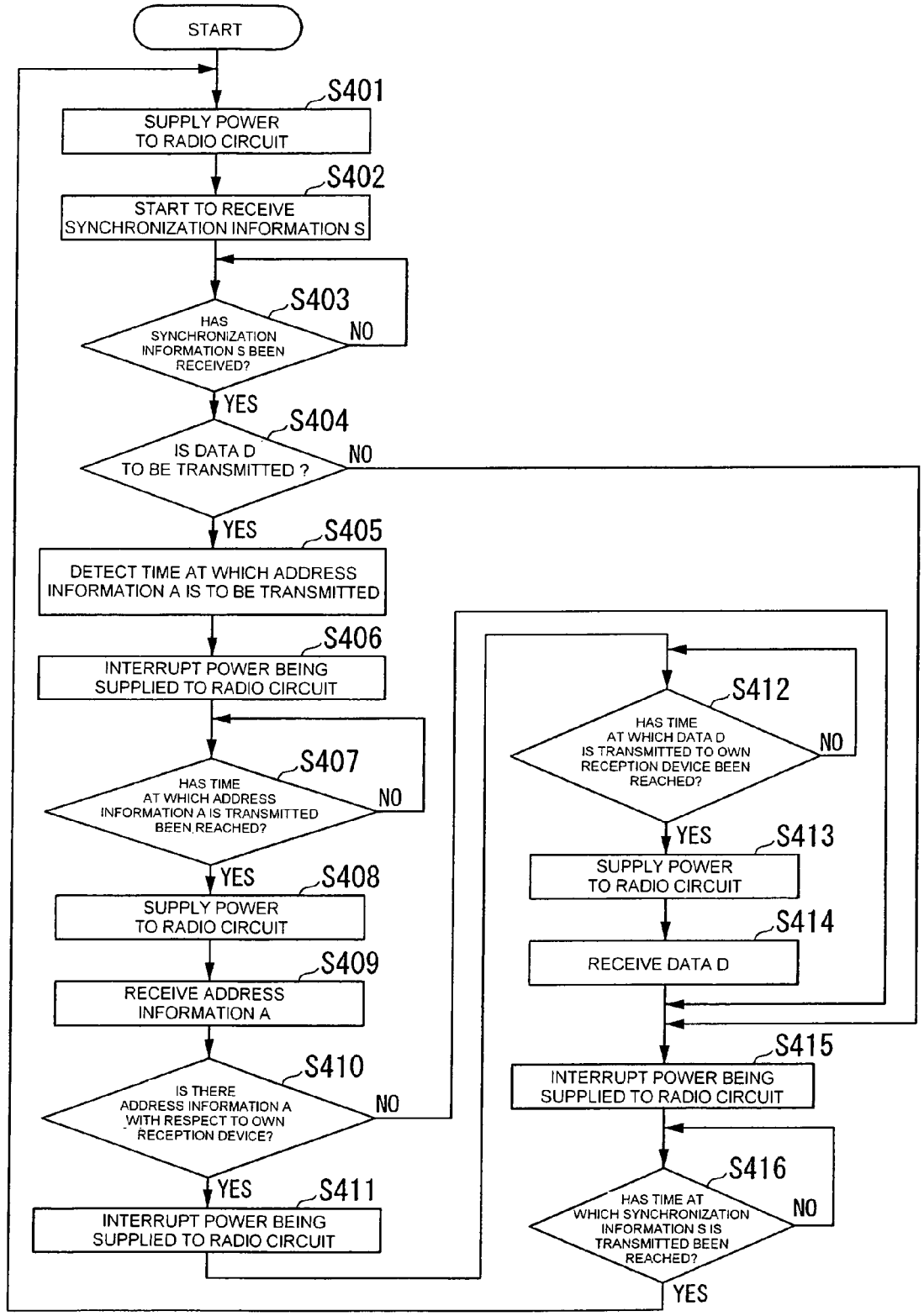
FIG. 19 A flowchart illustrating a procedure for an operation of the reception device according to the second embodiment.

Next described is an operation of the reception device 3 according to this embodiment. FIG. 19 is a flowchart illustrating a procedure for the operation of the reception device 3 according to this embodiment.

(Step S401) The power supply control section 714 of the reception device 3 controls the switch section 73 to supply power to the radio circuit of the radio communication section 72 in synchronization with the transmission of the synchronization information S addressed to the own reception device. After that, the procedure advances to Step S402.

(Step S402) The radio communication section 72 of the reception device 3 starts to receive the synchronization information S transmitted from the radio base station 2. After that, the procedure advances to Step S403.

(Step S403) The distribution data presence/absence detection section 711 of the reception device 3 determines whether or not the radio communication section 72 has received the synchronization information S addressed to the own reception device. If it is determined that the synchronization information S has been received, the procedure advances to Step S404, or otherwise returns to Step S403.

(Step S404) The distribution data presence/absence detection section 711 of the reception device 3 determines whether or not the data D is to be transmitted from the radio base station 2 based on the distribution data presence/absence information H included in the synchronization information S received by the radio communication section 72. Specifically, if the value of the distribution data presence/absence information H is "1", it is determined that the data D is to be transmitted from the radio base station 2, and if the value of the distribution data presence/absence information H is "0", it is determined that the data D is not to be transmitted from the radio base station 2. If it is determined that the transmission is to be performed, the procedure advances to Step S405, or otherwise advances to Step S415.

(Step S405) Based on the address information transmission start information At included in the synchronization information S received by the radio communication section 72, the address information transmission start time detection section 716 of the reception device 3 detects a time at which the address information A is to be transmitted from the radio base station 2. After that, the procedure advances to Step S406.

(Step S406) The power supply control section 714 of the reception device 3 controls the switch section 73 to temporarily interrupt the power being supplied to the radio circuit of the radio communication section 72. With regard to the timing to interrupt the power supply, there may be a method in which a transmission time period for the synchronization information S to be transmitted to the own reception device is set in advance and the power supply control section 714 is controlled according to the time period, a method in which information indicating the end of transmission is inserted into the last part of the synchronization information S addressed to the own reception device for the transmission and the information is detected by the reception device 3 to control the power supply control section 714, and other such methods. After that, the procedure advances to Step S407.

(Step S407) The reception time setting section 712 of the reception device 3 determines whether or not a time at which the address information A is transmitted to the own reception device from the radio base station 2 has been reached. If it is determined that the time for the transmission has been reached, the procedure advances to Step S408, or otherwise returns to Step S407.

(Step S408) The power supply control section 714 of the reception device 3 controls the switch section 73 to supply power to the radio circuit of the radio communication section 72. After that, the procedure advances to Step S409.

(Step S409) The radio communication section 72 of the reception device 3 receives the address information A transmitted from the radio base station 2. After that, the procedure advances to Step S410.

(Step S410) The distribution data presence/absence detection section 711 of the reception device 3 determines whether or not the address information A addressed to the own reception device is included in the address information A received in Step S409. If it is determined that the address information A addressed to the own reception device is included, the procedure advances to Step S411, or otherwise advances to Step S415.

(Step S411) The power supply control section 714 of the reception device 3 controls the switch section 73 to temporarily interrupt the power being supplied to the radio circuit of the radio communication section 72. With regard to the timing to interrupt the power supply, there may be a method in which a transmission timing for the address information A to be transmitted to the own reception device is set in advance and the power supply control section 714 is controlled according to the timing, a method in which information indicating the end of transmission is inserted into the last part of the address information A addressed to the own reception device for the transmission and the information is detected by the reception device 3 to control the power supply control section 714, and other such methods. After that, the procedure advances to Step S412.

(Step S412) The reception time setting section 712 of the reception device 3 determines whether or not a time at which the data D is transmitted to the own reception device 3 from the radio base station 2 has been reached. If it is determined that the time for the transmission has been reached, the procedure advances to Step S413, or otherwise returns to Step S412.

(Step S413) The power supply control section 714 of the reception device 3 controls the switch section 73 to supply power to the radio circuit of the radio communication section 72. After that, the procedure advances to Step S414.

(Step S414) The radio communication section 72 of the reception device 3 receives the data D transmitted from the radio base station 2. After that, the procedure advances to Step S415.

(Step S415) The power supply control section 714 of the reception device 3 controls the switch section 73 to interrupt the power being supplied to the radio circuit of the radio communication section 72. After that, the procedure advances to Step S416.

(Step S416) The reception time setting section 712 of the reception device 3 determines whether or not a time at which the synchronization information S is transmitted from the radio base station 2 to the own reception device 3 has been reached. If it is determined that the time for the transmission has been reached, the procedure advances to Step S401, or otherwise returns to Step S416.

A specific example of on/off timings of power supplied to the radio circuit of the reception device 3 in a case where the data D is not included in the frame (the data D is not to be transmitted from the radio base station 2) is the same as the example illustrated in FIG. 11 according to the first embodiment.

Figure 20:
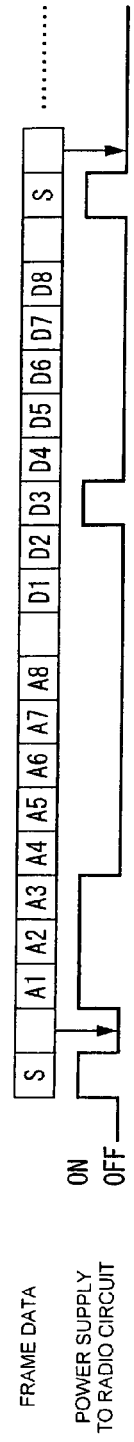
FIG. 20 A diagram illustrating on/off timings of power supplied to a radio circuit of the reception device according to the second embodiment.

Next, FIG. 20 is referenced to describe a specific example of on/off timings of power supplied to the radio circuit of the reception device 3 in a case where the data D is included in the frame (the data D is to be transmitted from the radio base station 2).

FIG. 20 is a diagram illustrating the on/off timings of the power supplied to the radio circuit within the radio communication section 72 of the reception device 3-3 which communicates to the radio base station 2-1 and whose address information is A3 among the reception devices 3 according to this embodiment. Note that, in the example illustrated in FIG. 20, the address information A to be transmitted to the reception device 3-3 is A3, and the data D is D3.

In the example illustrated in the figure, the reception device 3-3 has the power supplied to the radio circuit within the radio communication section 72 of the reception device 3-3 at the timing at which the synchronization information S addressed to the own reception device is transmitted from the radio base station 2-1 that communicates to the reception device 3-3. After the transmission of the synchronization information S from the radio base station 2-1 is finished, the reception device 3-3 has the power supply to the radio circuit within the radio communication section 72 interrupted. In other words, the power is kept from being supplied to the radio circuit of the reception device 3-3 after the transmission of the synchronization information S within the frame is completed until the transmission of the address information item A1 is started.

Next, the address information A start time At is measured, and the power supply to the radio circuit within the radio communication section 72 is started in synchronization with the transmission start time for the address information A within the frame. With this configuration, the power is kept being supplied to the radio circuit within the radio communication section 72 of the reception device 3-3 until the transmission of the address information item A3 to be transmitted to the reception device 3-3 is completed. In other words, the power is supplied to the radio circuit of the reception device 3-3 at the timing at which the address information items A1 to A3 within the frame are transmitted from the radio base station 2.

After the reception of the address information item A3 within the frame is completed, the reception device 3-3 keeps interrupting the power supply to the radio circuit within the radio communication section 72 until the transmission of the data item D3 addressed to the own reception device is started. In other words, the power is kept from being supplied to the radio circuit of the reception device 3-3 after the transmission of the address information item A3 within the frame is completed until the transmission of the data item D3 is started. After that, the power is again supplied to the radio circuit within the radio communication section 72 of the reception device 3-3 at a timing at which the data item D3 addressed to the reception device 3-3 is transmitted from the radio base station 2.

After the transmission of the data item D3 addressed to the own reception device within the frame is completed, the power supply to the radio circuit within the radio communication section 72 of the reception device 3-3 is kept being interrupted until the subsequent synchronization information S addressed to the own reception device is transmitted. In other words, the power is kept from being supplied to the radio circuit of the reception device 3-3 after the transmission of the data item D3 within the frame is completed.

As described above, the reception device 3 according to this embodiment receives the synchronization information S including the address information transmission start information At and detects the time at which the address information A is transmitted based on the received address information transmission start information At. Based on the detected time, the power supply control section 714 interrupts the power being supplied to the radio circuit of the radio communication section 72 until the time at which the address information A is transmitted. This can further reduce the power consumption caused by the reception device 3. Further, the battery provided to the reception device 3 can be made to last longer.

Third Embodiment

Next, a third embodiment of the present invention is described with reference to the drawings. This embodiment is an embodiment obtained by applying the address information A start time At, which is the address information transmission start information described in the second embodiment, to the first embodiment.

The configurations of the data distribution management device 1 and the reception device 3 and the flowcharts therefor are the same as those of the second embodiment, and hence description thereof is omitted here.

Figure 21:
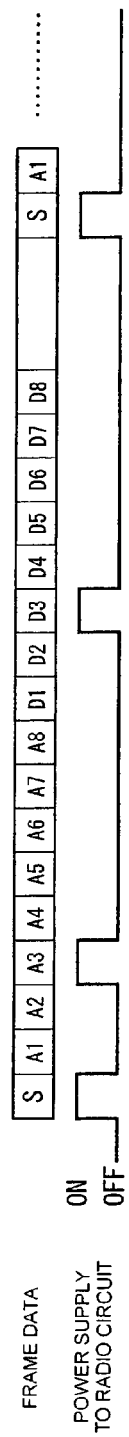
FIG. 21 A diagram illustrating on/off timings of power supplied to a radio circuit of a reception device according to a third embodiment.

FIG. 21 is a diagram illustrating on/off timings of the power supplied to the radio circuit within the radio communication section 72 of the reception device 3-3 whose address information is A3 among the reception devices 3-1 to 3-n illustrated in FIG. 1 according to the third embodiment. Note that, in the example illustrated in FIG. 21, the address information A to be transmitted to the reception device 3-3 is A3, and the data D is D3.

In the example illustrated in the figure, after the transmission of the synchronization information S within the frame from the radio base station 2 is finished, the own reception device 3-3 has the power supply to the radio communication section 72 interrupted. After that, the address information A start time At is measured, and the power supply to the radio communication section 72 is started in synchronization with the transmission start of the address information item A3 within the frame to be transmitted to the reception device 3-3. With this configuration, the power is kept being supplied to the radio circuit within the radio communication section 72 of the reception device 3-3 until the transmission of the address information item A3 within the frame to be transmitted to the reception device 3-3 is completed. After the reception of the address information item A3 within the frame is completed, the reception device 3-3 keeps interrupting the power supply to the radio circuit within the radio communication section 72 until the transmission of the data item D3 is started. After that, the power is supplied to the radio circuit within the radio communication section 72 of the reception device 3-3 at the timing at which the data item D3 addressed to the reception device 3-3 is transmitted from the radio base station 2. After the transmission of the data item D3 within the frame is completed, the power supply to the radio circuit within the radio communication section 72 of the reception device 3-3 is kept being interrupted until the subsequent synchronization information S is transmitted from the radio base station 2.

Note that, in this embodiment, the timing to start to transmit the address information item A3 within the frame to be transmitted to the reception device 3-3 is set according to the address information A start time At, but the timing to transmit the address information item A3 to be transmitted to the own reception device 3-3 may be set in advance to control the power supply to the radio circuit within the radio communication section 72 according to the timing.

Fourth Embodiment

Next, a fourth embodiment of the present invention is described with reference to the drawings. Note that, the configurations of the data distribution management device 1 and the reception device 3 and the flowcharts therefor are the same as those of the second embodiment, and hence description thereof is omitted here.

Figure 22:
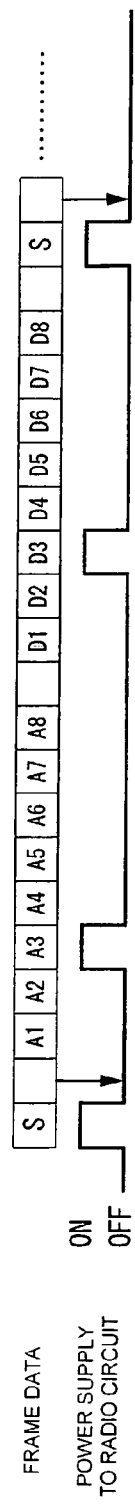
FIG. 22 A diagram illustrating on/off timings of power supplied to a radio circuit of a reception device according to a fourth embodiment.

FIG. 22 is a diagram illustrating on/off timings of the power supplied to the radio circuit within the radio communication section 72 of the reception device 3-3 which communicates to the radio base station 2-1 and whose address information is A3 among the reception devices 3-1 to 3-$x$ illustrated in FIG. 13, according to the fourth embodiment. Note that, in the example illustrated in FIG. 22, the address information A to be transmitted to the reception device 3-3 is A3, and the data D is D3.

In the example illustrated in the figure, the reception device 3-3 has the power supplied to the radio circuit within the radio communication section 72 of the reception device 3-3 at the timing at which the synchronization information S addressed to the own reception device is transmitted from the radio base station 2-1 that communicates to the reception device 3-3. After the transmission of the synchronization information S from the radio base station 2-1 is finished, the reception device 3-3 has the power supply to the radio circuit within the radio communication section 72 interrupted.

Next, the address information A start time At is measured, and the power supply to the radio circuit within the radio communication section 72 is started in synchronization with the transmission start time for the address information item A3 within the frame to be transmitted to the reception device 3-3. Note that, the address information transmission start information At according to this embodiment is information indicating the timing at which the transmission of the address information item A3 addressed to the reception device 3-3 within the frame is started. With this configuration, the power is kept being supplied to the radio circuit within the radio communication section 72 of the reception device 3-3 until the transmission of the address information item A3 to be transmitted to the reception device 3-3 is completed. After the reception of the address information item A3 within the frame is completed, the reception device 3-3 keeps interrupting the power supply to the radio circuit within the radio communication section 72 until the transmission of the data item D3 addressed to the own reception device is started. After that, the power is supplied to the radio circuit within the radio communication section 72 of the reception device 3-3 at the timing at which the data item D3 addressed to the reception device 3-3 is transmitted from the radio base station 2.

After the transmission of the data item D3 within the frame is completed, the power supply to the radio circuit within the radio communication section 72 of the reception device 3-3 is kept being interrupted until the subsequent synchronization information S addressed to the reception device 3-3 is transmitted from the radio base station 2-1.

According to the third and fourth embodiments, it is possible to further reduce the power consumption caused by the reception device 3, and the battery provided to the reception device 3 can be made to last much longer.

The embodiments of the present invention have been described in detail above with reference to the drawings, but specific structures and configurations are not limited to those of the embodiments, and designs and the like within the scope that does not depart from the gist of the invention are included.

INDUSTRIAL APPLICABILITY

The present invention can be applied to a frame generation device, a reception device, a data transmission/reception system, a frame generation method, and a reception method which are used for performing radio communications, and allows further reduction of the power consumption caused by the reception device.

REFERENCE SIGNS LIST 1 data distribution management device
2, 2-1~2-$m$ radio base station
3-1~3-$n$, 3-1~3-$x$ reception device
21, 41, 61 CPU
22, 42, 62 ROM
23, 43, 63 RAM
24, 65 display section
25, 45 data interface
26 input section
31 distribution data storage section
32 distribution data control section
33 connection information management section
34 transmission information generation section
35 frame data generation section
36 data distribution section
44, 64 radio circuit
51 data reception section
52 frame transmission control section
53 timing control section
54, 72 radio communication section
66, 74 battery
71 control section
73 switch section
341 synchronization information generation section
342 address information generation section
343 data generation section
344 distribution data presence/absence information generation section
345 address information transmission start information generation section
711 distribution data presence/absence detection section
712 reception time setting section
713 time information section
714 power supply control section
715 address information storage section
716 address information transmission start time detection section

DRAWINGS

FIG. 7
715 ADDRESS INFORMATION STORAGE SECTION
FIG. 8
(1) CASE WHERE ADDRESS SIGNAL START TIME IS FIXED SUCH AS CASE WHERE THERE IS ONLY ONE BASE STATION
(2) FRAME STRUCTURE
(3) STRUCTURAL EXAMPLE OF SYNCHRONIZATION SIGNAL (4) BIT SYNCHRONIZATION INFORMATION B
(5) FRAME INFORMATION F
(6) DISTRIBUTION DATA PRESENCE/ABSENCE INFORMATION H
FIG. 9
S104 SET DISTRIBUTION DATA PRESENCE/ABSENCE INFORMATION H TO "1" (PRESENT)
S117 SET DISTRIBUTION DATA PRESENCE/ABSENCE INFORMATION H TO "0" (ABSENT)
FIG. 10
S204 IS DATA D TO BE TRANSMITTED?

The invention claimed is:

1. A reception device, comprising:
a reception section for receiving synchronization information, address information, and data, the synchronization information including distribution data presence/absence information indicating whether or not the data is included in a frame including, in the following order:
the synchronization information being information for achieving synchronization with a transmission device that transmits the frame used for radio communications;
the address information indicating an address within the frame for transmitting the data; and
the data to be transmitted to the reception device;
a determination section for determining based on the distribution data presence/absence information whether or not the address information is to be transmitted by the frame; and
a power supply control section for controlling a power supply to the reception section, wherein:
the power supply control section supplies power to the reception section if the determination section determines that the address information is to be transmitted; and
the power supply control section interrupts the power being supplied to the reception section if the determination section determines that the address information is not to be transmitted.

2. The frame generation device according to claim 1, further comprising:
a frame generation section for generating a frame including, in the following order:
synchronization information being information for achieving synchronization with a reception device that receives information within the frame used for radio communications;
address information indicating an address within the frame for transmitting data; and
the data to be transmitted to the reception device;
a presence/absence information generation section for generating distribution data presence/absence information indicating whether or not the data is included in the frame; and
a synchronization information generation section for generating the synchronization information including the distribution data presence/absence information.

3. The frame generation device according to claim 1, further comprising:
a frame generation section for generating a frame including, in the following order:
synchronization information being information for achieving synchronization with a reception device that receives information within the frame used for radio communications;
address information indicating an address within the frame for transmitting data; and
the data to be transmitted to the reception device;
an address information transmission start information generation section for generating address information transmission start information indicating a timing at which transmission of the address information is started within the frame; and
a synchronization information generation section for generating the synchronization information including the address information transmission start information.

4. A reception device, comprising:
a reception section for receiving synchronization information, address information, and data, the synchronization information including address information transmission start information indicating a timing at which transmission of the address information is started within a frame including, in the following order:
the synchronization information being information for achieving synchronization with a transmission device that transmits the frame used for radio communications;
the address information indicating the address within the frame for transmitting the data; and
the data to be transmitted to the reception device; and
a power supply control section for keeping interrupting a power supply to the reception section until the address information is transmitted, based on the address information transmission start information.

5. A data transmission/reception system, comprising:
a frame generation device;
a reception device; and
a transmission device for transmitting a frame generated by the frame generation device to the reception device, wherein:
the frame generation device comprises:
a frame generation section for generating the frame including, in the following order:
synchronization information being information for achieving synchronization with the reception device that receives information within the frame used for radio communications;
address information indicating an address within the frame for transmitting data; and
the data to be transmitted to the reception device;
a presence/absence information generation section for generating distribution data presence/absence information indicating whether or not the data is included in the frame; and
a synchronization information generation section for generating the synchronization information including the distribution data presence/absence information;
the reception device comprises:
a reception section for receiving the synchronization information, the address information, and the data, the synchronization information including the distribution data presence/absence information indicating whether or not the data is included in the frame including, in the following order:
the synchronization information being information for achieving synchronization with the transmission device that transmits the frame used for radio communications;
the address information indicating the address within the frame for transmitting the data; and
the data to be transmitted to the reception device;

a determination section for determining, based on the distribution data presence/absence information, whether or not the address information is to be transmitted by the frame; and a power supply control section for controlling a power supply to the reception section;

the power supply control section supplies power to the reception section if the determination section determines that the address information is to be transmitted; and the power supply control section interrupts the power being supplied to the reception section if the determination section determines that the address information is not to be transmitted.

6. A data transmission/reception system, comprising:
a frame generation device;
a reception device; and
a transmission device for transmitting a frame generated by the frame generation device to the reception device, wherein:
the frame generation device comprises:
a frame generation section for generating a frame including, in the following order:
synchronization information being information for achieving synchronization with the reception device that receives information within the frame used for radio communications;
address information indicating an address within the frame for transmitting data; and
the data to be transmitted to the reception device;
an address information transmission start information generation section for generating address information transmission start information indicating a timing at which transmission of the address information is started within the frame; and
a synchronization information generation section for generating the synchronization information including the address information transmission start information; and
the reception device comprises:
a reception section for receiving the synchronization information, the address information, and the data, the synchronization information including the address information transmission start information indicating the timing at which the transmission of the address information is started within the frame including, in the following order:
the synchronization information being information for achieving synchronization with the transmission device that transmits the frame used for radio communications;
the address information indicating the address within the frame for transmitting the data; and
the data to be transmitted to the reception device; and
a power supply control section for keeping interrupting a power supply to the reception section until the address information is transmitted, based on the address information transmission start information.

7. A reception method for a reception device comprising a reception section, a determination section, and a power supply control section, the reception method comprising:
a reception step of receiving, by the reception section, synchronization information, address information, and data, the synchronization information including distribution data presence/absence information indicating whether or not the data is included in a frame including, in the following order:
the synchronization information being information for achieving synchronization with a transmission device that transmits the frame used for radio communications;
the address information indicating an address within the frame for transmitting the data; and
the data to be transmitted to the reception device;
a determination step of determining, by the determination section, based on the distribution data presence/absence information, whether or not the address information is to be transmitted by the frame; and
a power supply control step of controlling, by the power supply control section, a power supply to the reception section, wherein:
the power supply control step comprises supplying power to the reception section if it is determined in the determination step that the address information is to be transmitted; and
the power supply control step comprises interrupting the power being supplied to the reception section if it is determined in the determination step that the address information is not to be transmitted.

8. The frame generation method according to claim 7, further comprising:
a frame generation step of generating a frame including, in the following order:
synchronization information being information for achieving synchronization with a reception device that receives information within the frame used for radio communications;
address information indicating an address within the frame for transmitting data; and
the data to be transmitted to the reception device;
a presence/absence information generation step of generating distribution data presence/absence information indicating whether or not the data is included in the frame; and
a synchronization information generation step of generating the synchronization information including the distribution data presence/absence information.

9. The frame generation method according to claim 7, further comprising:
a frame generation step of generating a frame including, in the following order:
synchronization information being information for achieving synchronization with a reception device that receives information within the frame used for radio communications;
address information indicating an address within the frame for transmitting data; and
the data to be transmitted to the reception device;
an address information transmission start information generation step of generating address information transmission start information indicating a timing at which transmission of the address information is started within the frame; and
a synchronization information generation step of generating the synchronization information including the address information transmission start information.

10. A reception method for a reception device comprising a reception section, a determination section, and a power supply control section, the reception method comprising:
a reception step of receiving, by the reception section, synchronization information, address information, and data, the synchronization information including address information transmission start information indicating a timing at which transmission of the address information is started within a frame including, in the following order:

the synchronization information being information for achieving synchronization with a transmission device that transmits the frame used for radio communications;

the address information indicating the address within the frame for transmitting the data; and the data to be transmitted to the reception device; and a power supply control step of keeping interrupting a power supply to the reception section until the address information is transmitted, based on the address information transmission start information.

* * * * *